United States Patent Office 3,021,298
Patented Feb. 13, 1962

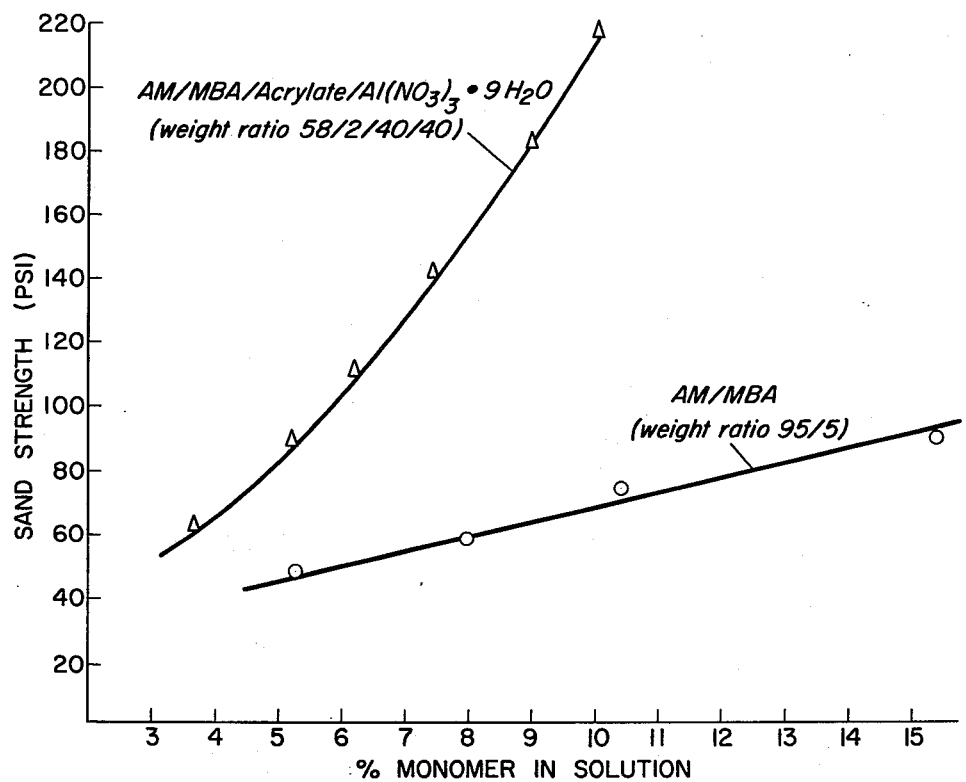
FOR EACH SAMPLE, 50 PARTS OF SOLUTION WERE MIXED WITH 210 PARTS OF SAND
INVENTOR
DAVID H. RAKOWITZ

3,021,298
SOIL STABILIZATION WITH A COMPOSITION CONTAINING AN ACRYLAMIDE, A BISACRYLAMIDE, AND ALUMINUM AND ACRYLATE IONS
David H. Rakowitz, Riverside, Conn., assignor to American Cyanamid Company, New York, N.Y., a corporation of Maine
Filed Mar. 3, 1959, Ser. No. 796,804
9 Claims. (Cl. 260—41)

The present invention relates to methods for the stabilization of soils with polymeric material and more particularly to an improved soil stabilization system for treating soil to render it impermeable to the transmission of water and other substantially inert fluids. In a more detailed scope the present invention relates to a water-soluble system of monomeric materials comprising an acrylamide, an alkylidene bisacrylamide and compounds furnishing a combination of ions comprising a trivalent metal cation and an acrylate ion, said system being capable of being applied in aqueous solution to soil and polymerized and cross-linked with the aid of a catalyst, in admixture with, and incorporating soil as an integral part of the reaction mass, to a state of water insolubility and impermeability.

The soil stabilizers contemplated for use in the present invention make use of an acrylamide and an alkylidene bisacrylamide as disclosed in U.S. Patent No. 2,801,984. According to the disclosure in that patent, the polymer-soil aggregate is stabilized to a condition of insolubility in water and other inert liquids such as oils, light hydrocarbons and the like. The mechanism effecting insolubilization of the polymeric material therein is based upon a covalent mechanism provided by cross-linking of the polymer chains with the alkylidene bisacrylamide. I have discovered that a very substantially superior result is obtained by the system of the present invention in which an ionic cross-linking of the polymeric mass is utilized in addition to the covalent mechanism provided by the alkylidene bisacrylamide. The added strength to the three-dimensional network provided by the ionic mechanism affords a marked improvement over that obtained by the covalent mechanism alone. The combination or dual cross-linking of covalent and ionic mechanisms taken together lend substantially greater strength and impermeability to the stabilized soil-polymer mass than either alone, for a given quantity of polymerizable material.

It is an object of the present invention to provide a novel and more effective soil stabilization system and method than those heretofore available. It is a further object of the present invention to provide a stabilizer system in which the insolubilization of the polymerized material is effected by cross-linking through covalent bonds as well as by ionic bonds. Further objects will become apparent as the description of the invention proceeds.

In soil stabilization, the product applied to the soil should be in a form permitting easy application thereof to the soil and preferably it should be water soluble in order that the polymerizable material readily and homogeneously distributes throughout the area of soil to be treated by practical and easily adaptable techniques. The nature of the water-insoluble polymer which is formed with the soil is in effect a hydrophyllic gel which is capable of holding water in retainment but which is insoluble in and impermeable to water at the saturated state of the gel.

In operation, application of the soil stabilizer involves the incorporation in the soil of the stabilizing material which then forms a gel (which embodies the soil) by polymerization. This is to be distinguished from the process of adding polymerized compositions to soil for the purpose of conditioning soil to improve the tilth thereof. Soil stabilization, the procedure with which the invention is concerned, results in a water and air impermeabilized integral mass of soil and cross-linked polymer which prevents the passage of water and air therethrough. In the stabilized area, a strengthened insoluble, impermeable barrier or volume of earth is formed. Soil conditioning, on the other hand, alters the soil to a state of relatively fine aggregates capable of permitting passage of both air and water therethrough, thereby promoting the soil's capability for the growth of plants. In soil stabilization, the gelled polymeric structure which is formed by polymerization of the monomeric mixture in situ on the soil is effective in sealing pores, crevices and fissures. When injected into soil and reacted into a polymeric network, the polymeric mixture and soil forms a unitary, impermeable and greatly strengthened three-dimensional soil mass.

The composition of the invention may be used beneficially to seal fissures and crevices in stone or rock or other subterranean formations or with any soil including silt, sands, loams, clays, etc., both naturally occurring and those which have been processed by mining, washing, etc., such as bentonite, kaolinite and the like. Soil mixtures are also within the scope of the invention, including such materials as oil well drilling muds. Thus, the term "soil" is used herein in a broad sense and expressions such as "ground" and "earth" are employed to denote the solid surface of the earth and its interior.

In practicing the invention, a copolymerizable composition containing (I) acrylamide; (II) an alkylidene bisacrylamide having the formula:

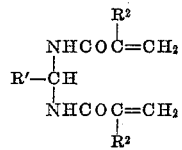

in which

is a hydrocarbon residue of an aldehyde and $R^2$ is a member of the group consisting of hydrogen and a methyl radical; and (III) compounds of ions comprising a trivalent metal cation, e.g., aluminum or chromium; and an acrylate anion, are used in producing a barrier or soil mass resistant to water permeability. This essential combination of ingredients affords markedly improved load-bearing properties to the soil-polymer composition. The trivalent metal required to furnish the requisite cation for component (III) of the system may be derived from any suitable salt such as aluminum or chromium sulfate, or aluminum or chromium nitrate. The acrylate ion is likewise furnished from compounds which when dissolved in water furnish the anion. Employing aluminum as the trivalent metal, the provision of a system containing the requisite cation and acrylate anion may be obtained according to the following procedure:

(1) The requisite amount of acrylamide and alkylidene bisacrylamide in aqueous solution is prepared.
(2) A calculated amount of acrylic acid is dissolved in this solution.
(3) Enough base is added to neutralize the acid and form a water-soluble acrylate salt. Any base can be used although sodium or potassium hydroxide is preferred. The amount of base required can be precalculated (one mole per mole of acrylic acid) or can be added to the acid until a pH of 7–8 has been reached.
(4) A soluble aluminum salt is then added (sulfate, nitrate or chloride). Aluminum chloride is to be avoided when silver nitrate is part of the catalyst system because of the formation of insoluble AgCl and consequently loss of efficiency of catalyst. There is then in solution both the acrylate and aluminum ions. The acrylate to aluminum molar ratio should be between 2.5 and 8 to 1.

(5) A suitable catalyst system is then utilized to effect polymerization.

The order of mixing these components is not essential nor is the order in which they are mixed with the other components of the system. The catalyst is normally added last, just prior to admixture with the soil, so as to preclude premature gelation.

The molar ratio of acrylate ion to trivalent metal ion is preferably maintained in the range of between 2.5 and 8 to 1. Other trivalent metallic cations, such as chromium, may also be used in a like manner. Because of its greater solubility, the acrylate ion is the preferred anion, although methacrylate ion may also be employed. In addition to acrylamide itself, which is the preferred monomer for component (I) of the system, methacrylamide and N-methylol acrylamide may also be employed and consequently acrylamide as employed herein contemplates the inclusion also of methacrylamide and N-methylol acrylamide.

In addition to the comonomer N,N'-methylene bisacrylamide set out in the examples hereinafter, any of the alkylidene bisacrylamides corresponding to the above formula which are described and claimed in Lundberg Patent No. 2,474,846 or mixtures thereof may be used as cross-linking agents. Only slight solubility is required of the alkylidene bisacrylamide in view of the small amount used; therefore, this component may have a water solubility as low as about 0.02% by weight at 20° C. but a solubility of at least about 0.10% is more desirable for general purposes. Conversion of the polymerizable material to the water-insoluble condition is brought about (1) by addition or vinyl type polymerization with covalent cross-linking by the bisacrylamide and (2) by ionic cross-linking by way of the trivalent metal acrylate resulting in a three-dimensional structure, the polymerization and subsequent gelation being effected by a suitable catalyst.

The polymerization reaction according to the invention may be activated by employing a single component catalyst or a two-component redox catalyst system. Suitable catalysts are such as the water-soluble oxygen-containing catalysts, e.g., ammonium, potassium and sodium persulfates, hydrogen peroxide, the alkali metal and ammonium perchlorates and the like. A redox catalyst system may also be used. As the oxidizing component in redox systems, any of the usual water-soluble peroxy catalysts, derived from peracids such as persulfuric, perchloric, perboric and permanganic and their salts may be employed. For example, ammonium, potassium and sodium persulfates, hydrogen peroxide, the alkali metal and ammonium perchlorates, and the like may be employed. As the reducing agent for redox catalyst systems various reducing components such as sodium thiosulfate, sodium or potassium bisulfite, thiosulfate, or metabisulfite; silver nitrate; nitrilotrispropionamide and the like may be used. Illustrative examples of suitable redox catalyst systems are ammonium persulfate-nitrilotrispropionamide, and potassium persulfate-nitrilotrispropionamide systems. A mixture of the two catalyst components in a redox system in quantities corresponding to their oxidation-reduction equivalents is not a requirement but may be desirable for some purposes. A particularly effective catalyst system giving stabilized soil of excellent strength has been obtained using the persulfate-silver nitrate system.

In general, a minimum of about 0.1% catalyst based on the weight of polymerizable monomers is desirable, although amounts of as little as 0.01% and up to about 25% may be employed. Preferably, amounts of from about 0.5% to about 10% based on the weight of the monomers are employed. With acrylamide and methylene bisacrylamide and sodium acrylate as the comonomers (and aluminum ion as the ionic cross-linking agent) it has been found desirable to use about 0.25% to 5% by weight, based on the weight of the monomers, of each of the components of the redox catalyst.

In appropriate situations where a delay in the polymerization and insolubilization of the catalyzed soil stabilizer, after its application to soil, is desired, the reaction may be inhibited by the use of a ferrocyanide or ferricyanide according to the procedure disclosed in my copending U.S. patent application, Serial No. 645,009, now Patent No. 2,940,729.

When permeating soil the amount of stabilizer material to soil being treated may vary fairly widely. The ratio of polymerizable material generally comprises from about 50% to about 90%, preferably about 50% to 80%, of acrylamide monomer; from about 10% to about 50% of the acrylate and from about 0.5% to about 20% alkylidene diacrylamide, and preferably about 1% to 10% based on total polymerizable material. The amount of polymerizable stabilizer to soil may vary widely but is normally in the range of about 1 part by weight of polymerizable material to between about 5 to about 100 parts by weight of soil. The preferred range is between about 25 and about 100 parts of soil per part of polymerizable material.

Ordinarily, the polymerizable material is dissolved in water to form a solution which is conveniently pumped into the earth formation, often under pressure or otherwise mixed with soil. The concentration of the solution and the quantity used may be regulated so that the concentration of water in the final mixture of soil and stabilizing component varies anywhere between about 5% and about 50% by weight, depending primarily on the type of soil. Sand, for example, requires much less water than do certain of the clays. The proportions of water used determines to some extent the properties of the resulting stabilized soil. It appears that the optimum conditions for polymerization are realized with sufficient water present to saturate the soil, that is, to fill all voids between soil particles and pores therein with the solution of mixed monomers, at the desired degree of compaction when polymerization occurs. The invention, however, is not limited to saturated soil compositions, as substantial advantages are obtained with only partly saturated soil masses.

When employed to seal crevices or fissures in underground formations the stabilizer solution is forced down into these formations in sufficient quantities to fill these voids and under sufficient pressure to offset static pressure which varies depending on depth. Such solution may be catalyzed as injected or a separate catalyst solution may be injected to mix with the stabilizer solution at appropriate intervals.

The stabilizer composition of the invention may be applied to the soil by use of any of the various techniques described in U.S. Patent No. 2,801,985, and in my aforementioned copending patent application, Serial No. 645,009.

Copolymers of the type herein employed upon polymerization are equally impermeable to water, crude petroleum, and other substantially inert liquids and may be employed for lining or stabilizing wells, pits, quarries, and other earth recesses.

This invention has wide utility for any purpose in which it is desired to provide a strengthened area, e.g., for roadways, airfields, and the like; or to form an impermeable barrier in porous or creviced formations; or to cohere and strengthen soil masses, to impart high viscosity, solid or rubber-like properties to soil; or to minimize or substantially eliminate the permeability of soil to water and other substantially inert liquids; or to increase resistance to leakage or erosion of the soil by moving liquids.

In order that the present invention may be more fully understood, the following examples are set forth for purposes of illustration only and any specific enumeration of details should not be interpreted as a limitation, except as expressed in the appended claims.

Unconfined compression strengths for soil stabilized according to the invention as well as strengths for the comparative examples is derived by testing of soil samples according to the following procedure:

Stabilized sand cylinders are prepared in cylindrical lucite molds 4″ high by 1½″ I.D. An aqueous solution of soil stabilizer of predetermined concentration is prepared and when ready to be mixed with the soil, the catalyst is introduced into the solution. Before gelation can occur, 50 parts of the catalyzed aqueous solution is added to 210 parts of said placed in the mold; the mold vibrated to compact the sand; the mixture then polymerizing and cross-linking to a substantially water-insoluble state. After gelation, the sand cylinder is removed from the mold and a stress-strain measurement made on a Karol-Warner Compression Tester Model 545. This test comprises a uniaxial compression of the sample in which the test specimen of stabilized soil is provided with no lateral support, while undergoing vertical compression. This test measures the unconfined compressive strength of a cylinder of cohesive or semi-cohesive soil and, indirectly, the shearing strength. The shearing strength of the soil is generally taken to be one-half the unconfined compressive strength.

The unconfined compression test is the quickest and simplest method in common use for determining the shearing strength of a cohesive soil. The test can be conducted either in the laboratory or the field; field tests are performed by use of the unconfined compression devices, such as the Karol-Warner Tester above noted or one of those manufactured by Soiltest, Incorporated of Chicago.

In order that the invention may be more fully understood, the following illustrative examples are set forth.

*Example 1*

A 10% aqueous monomer solution comprising 5.8 parts of acrylamide; 0.2 part of methylene bisacrylamide; 4 parts of sodium acrylate and 3.5 parts aluminum sulfate $[Al_2(SO_4)_3 \cdot 18H_2O]$ dissolved in 86.2 parts of water together with the catalyst system comprising 0.06 part silver nitrate and 0.24 part ammonium persulfate is prepared. 50 parts of this solution is mixed, prior to any opportunity for gelation to occur, with 210 parts sand, densified and allowed to gel. The stabilized soil has an unconfined compression strength of 190 p.s.i.

*Example 2 (comparative)*

A 10% aqueous monomer solution (equal in concentration to that of Example 1) comprising 9.5 parts acrylamide; 0.5 part methylene bisacrylamide; dissolved in 89.7 parts of water with the catalyst system comprising 0.06 part silver nitrate and 0.24 part ammonium persulfate is prepared. 50 parts of this catalyzed solution is mixed before any opportunity for gel to occur, with 210 parts of sand, densified (by vibration) and allowed to gel. The stabilized soil has an unconfined compression strength of 71 p.s.i. which is very substantially inferior to the stabilized soil treated as described in Example 1 wherein the combination of trivalent metal and acrylate ions are present in the soil stabilizer solution.

*Example 3*

(a) A 5% aqueous monomer solution comprising 2.9 parts acrylamide; 0.1 part methylene bisacrylamide; 2 parts sodium acrylate; and 1.77 parts of aluminum sulfate dissolved in 92.93 parts of water containing as catalyst 0.06 part silver nitrate and 0.24 part ammonium persulfate is prepared. Before the catalyst solution has an opportunity to gel, 50 parts of this solution is admixed with 210 parts of sand and densified by vibration and allowed to gel. The stabilized sand has an unconfined compression strength of 82.5 p.s.i.

(b) Example 3(a) is repeated with the exception that 4.75 parts of acrylamide and 0.25 part of methylene bisacrylamide dissolved in 94.7 parts of water is utilized together with the stated catalyst system to form a 5% monomer solution containing neither an acrylate nor a trivalent metal ion. The stabilized sand using this system has an unconfined compression strength of 42 p.s.i.

*Example 4*

A 10% aqueous monomer solution comprising 8.5 parts acrylamide; 0.5 part methylene bisacrylamide; 1 part sodium acrylate and 1.07 parts chromium nitrate $[Cr(NO_3)_3 \cdot 9H_2O]$ dissolved in 88.8 parts of water and catalyzed with a redox catalyst system comprising 0.06 part silver nitrate and 006 part ammonium persulfate is prepared. Before gelation can occur, 50 parts of this solution is mixed with 210 parts of sand, densified and gelled. The unconfined compression strength of the stabilized sand is 126 p.s.i.

*Example 5*

(a) A 10% aqueous monomer solution comprising a monomeric mixture of 5.5 parts acrylamide; 0.5 part methylene bisacrylamide; 4 parts of sodium methacrylate and 4 parts aluminum nitrate $[Al(NO_3)_3 \cdot 9H_2O]$ in 85.7 parts of water using as catalyst 0.06 part silver nitrate and 0.24 part ammonium persulfate is prepared. Before gelation of this solution has an opportunity to occur, 50 parts thereof is mixed with 210 parts of sand, densified and gelled. The unconfined compression strength is found to be 142 p.s.i.

(b) The procedure of Example 5(a) is repeated with the exception that 5.5 parts of methylol acrylamide is substituted for the like amount of acrylamide and instead of aluminum nitrate 4 parts of aluminum sulfate is used. The unconfined compression strength of the stabilized soil sample is 168 p.s.i.

*Example 6 (comparative)*

A 10% aqueous monomer solution comprising 6 parts acrylamide; 0.5 part methylene bisacrylamide; and 3.5 parts sodium acrylate dissolved in 89.7 parts of water with a catalyst comprising 0.06 part silver nitrate and 0.24 part ammonium persulfate is prepared. Before gelation can occur, 50 parts of the solution is admixed with 210 parts of sand, densified and allowed to gel. The stabilized sand has an unconfined compression strength of 80 p.s.i.

*Example 7*

Example 6 is repeated with the exception that 4 parts of aluminum nitrate $[Al(NO_3)_3 \cdot 9H_2O]$ is additionally employed as a constituent of the monomeric solution. 85.7 parts of water instead of 89.7 parts is used. The unconfined compression strength obtained is 180 p.s.i. Comparison of the resulting strength obtained in this example with the strength of the soil obtained in Example 6 in which the trivalent metal ion, aluminum, is omitted shows the added advantage of the ionic cross-linking in the stabilized soil.

*Example 8 (comparative)*

A 10% aqueous monomer solution comprising 6.5 parts acrylamide; 0.5 part methylene bisacrylamide; 3 parts sodium acrylate and 4.9 parts calcium nitrate $[Ca(NO_3)_2 \cdot 4H_2O]$ dissolved in 84.62 parts of water together with a redox catalyst comprising 0.36 part dimethylaminopropionitrile and 0.12 part persulfate is prepared. Before this solution is able to gel, 50 parts thereof is mixed with 210 parts of sand, densified, and allowed to gel. It has an unconfined compression strength of 72 p.s.i. This example in which the divalent metal ion, calcium, is employed, shows that it is critical that a trivalent metal be used in order to obtain the improved strength as taught by the invention.

In Examples 9–12, the procedure of Example 3 is followed using a 5% aqueous monomer solution of stabilizer with the catalyst systems varied and with other exceptions noted.

*Example 9*

The procedure using the monomeric ingredients of Example 3 is followed, except that instead of 1.77 parts of aluminum sulfate as the trivalent metal cation furnishing compound 2 parts of aluminum nitrate [$Al(NO_3)_3 \cdot 9H_2O$] is used and as catalyst 0.12 part of ammonium persulfate and 0.72 part of dimethylaminopropionitrile is used. The unconfined compression strength of the soil stabilized with this 5% solution is 61.5 p.s.i.

*Example 10*

The procedure of Example 3 is followed using like amounts of acrylamide, methylene bisacrylamide, sodium acrylate and aluminum sulfate, but the catalyst system comprising 0.5 part of ammonium persulfate and 0.3 part of trimethanolamine is used in place of the catalyst system comprising 0.24 part of ammonium persulfate and 0.06 part of silver nitrate. The unconfined compression strength of the soil stabilized with a 5% solution of the above is 78 p.s.i.

*Example 11*

The procedure of Example 3 is followed using the same ingredients and amounts with the exception that 0.3 part of methylene bisacrylamide instead of 0.1 part is used and the catalyst system comprising 1 part of ammonium persulfate is used instead of the 0.24 part of ammonium persulfate and 0.06 part of silver nitrate of Example 3. The unconfined compression strength of the stabilized soil sample is 61 p.s.i.

*Example 12*

The procedure followed for Example 3 is utilized using like ingredients and like amounts, with the exception that the catalyst system comprising 2.5 parts of ammonium persulfate and 0.0005 part of sodium bisulfite and a slightly lesser amount, i.e., 90.7 parts of water, is used. The unconfined compression strength is 73 p.s.i.

A further illustration of the advantages of the improved system of the invention is provided by the curves set forth in FIG. 1, wherein the strengths at various concentrations of monomeric mixture containing compounds furnishing the trivalent metal cation and acrylate ion is compared with a monomeric mixture in which compounds furnishing these ions are omitted.

I claim:

1. The method of stabilizing soil which comprises contacting soil with an aqueous solution of a polymerizable composition comprising from about 50% to about 90% by weight of an acrylamide, from about 0.5% to about 20% by weight of an alkylidene bisacrylamide, a trivalent metal ion selected from the group consisting of aluminum and chromium, and an acrylate ion in a molar ratio falling within the range of from about 1:2.5 and 1:8 metal ion to acrylate respectively, said acrylate ion being present in the polymerizable composition in amounts ranging from about 10% to 50% by weight and effecting, under atmospheric conditions, polymerization and water insolubilization of said polymerizable composition on the soil, by introduction into said solution of polymerizable material, from about 0.1% to about 25% by weight of a water soluble oxygen-containing polymerization catalyst, wherein said percentages by weight are based on the total weight of the polymerizable material.

2. The method of stabilizing soil which comprises contacting soil with an aqueous solution of a polymerizable composition comprising from about 50% to about 90% by weight of acrylamide, from about 0.5% to about 20% by weight of an alkylidene bisacrylamide, aluminum ion and an acrylate ion in a molar ratio falling within the range of from about 1:2.5 and 1:8 aluminum ion to acrylate respectively, said acrylate ion being present in the polymerizable composition in amounts ranging from about 10% to 50% by weight and effecting, under atmospheric conditions, polymerization and water insolublization of said polymerizable composition on the soil, by introduction into said solution of polymerizable material, from about 0.1% to about 25% by weight of a water soluble oxygen-containing polymerization catalyst, wherein said percentages by weight are based on the total weight of the polymerizable material.

3. The method of stabilizing soil which comprises contacting soil with an aqueous solution of a polymerizable composition comprising from about 50% to about 90% by weight of acrylamide, from about 0.5% to about 20% by weight of an alkylidene bisacrylamide, chromium ion and an acrylate ion in a molar ratio falling within the range of from about 1:2.5 and 1:8 chromium ion to acrylate respectively, said acrylate being present in the polymerizable composition in amounts ranging from about 10% to 50% by weight and effecting, under atmospheric conditions, polymerization and water insolublization of said polymerizable composition on the soil, by introduction into said solution of polymerizable material, from about 0.1% to about 25% by weight of a water soluble oxygen-containing polymerization catalyst, wherein said percentages by weight are based on the total weight of the polymerizable material.

4. The method of stabilizing soil which comprises contacting soil with an aqueous solution of a polymerizable composition comprising from about 50% to about 90% by weight of acrylamide, from about 0.5% to about 20% by weight of a methylene bisacrylamide, aluminum ion and an acrylate ion in a molar ratio falling within the range of from about 1:2.5 and 1:8 aluminum ion to acrylate respectively, said acrylate being present in the polymerizable composition in amounts ranging from about 10% to 50% by weight and effecting, under atmospheric conditions, polymerization and water insolublization of said polymerizable composition on the soil, by introduction into said solution of polymerizable material, from about 0.1% to about 25% by weight of a water soluble oxygen-containing polymerization catalyst, wherein said percentages by weight are based on the total weight of the polymerizable material.

5. The method of stabilizing soil which comprises contacting soil with an aqueous solution of a polymerizable composition comprising from about 50% to about 90% by weight of an acrylamide, from about 0.5% to about 20% by weight of a methylene bisacrylamide, chromium ion and an acrylate ion in a molar ratio falling within the range of from about 1:2.5 and 1:8 chromium ion to acrylate respectively, said acrylate being present in the polymerizable composition in amounts ranging from about 10% to 50% by weight and effecting, under atmospheric conditions, polymerization and water insolubilization of said polymerizable composition on the soil, by introduction into said solution of polymerizable material, from about 0.1% to about 25% by weight of a water soluble oxygen-containing polymerization catalyst, wherein said percentages by weight are based on the total weight of the polymerizable material.

6. The method of stabilizing soil which comprises contacting soil with an aqueous solution of a polymerizable composition comprising from about 50% to about 90% by weight of acrylamide, from about 0.5% to about 20% by weight of a methylene bisacrylamide, aluminum ion and an acrylate ion in a molar ratio falling within the range of from about 1:2.5 and 1:8 aluminum ion to acrylate respectively, said acrylate being present in the polymerizable composition in amounts ranging from about 10% to 50% by weight and effecting, under atmospheric conditions, polymerization and water insolubilization of said polymerizable composition on the soil, by introduction into said solution of polymerizable material, from about 0.1% to about 25% by weight of a water soluble redox catalyst, wherein said percentages by weight are based on the total weight of polymerizable material.

7. The method of stabilizing soil which comprises contacting soil with an aqueous solution of a polymerizable composition comprising from about 50% to about 90% by weight of acrylamide, from about 0.5% to about 20% by weight of a methylene bisacrylamide, aluminum sulfate and sodium acrylate in a molar ratio falling within the range of from about 1:2.5 and 1:8 aluminum sulfate to sodium acrylate respectively, said acrylate being present in the polymerizable composition in amounts ranging from about 10% to 50% by weight and effecting, under atmospheric conditions, polymerization and water insolubilization of said polymerizable composition on the soil, by introduction into said solution of polymerizable material, from about 0.1% to about 25% by weight of a water soluble redox catalyst, wherein said percentages by weight are based on the total weight of the polymerizable material.

8. The method of stabilizing soil which comprises contacting soil with an aqueous solution of a polymerizable composition comprising from about 50% to about 90% by weight of acrylamide, from about 0.5% to about 20% by weight of a methylene bisacrylamide, aluminum sulfate and sodium acrylate in a molar ratio falling within the range of from about 1:2.5 and 1:8 aluminum sulfate to sodium acrylate respectively, said acrylate being present in the polymerizable composition in amounts ranging from about 10% to 50% by weight and effecting, under atmospheric conditions, polymerization and water insolubilization of said polymerizable composition on the soil, by introduction into said solution of polymerizable material, from about 0.1% to about 25% by weight of a water soluble redox catalyst comprising ammonium persulfate and silver nitrate.

9. The method of stabilizing soil which comprises contacting soil with an aqueous solution of a polymerizable composition comprising from about 50% to about 90% by weight of a methylol acrylamide, from about 0.5% to about 20% by weight of an alkylidene bisacrylamide, a trivalent metal ion selected from the group consisting of aluminum and chromium, and an acrylate ion in a molar ratio falling within the range of from about 1:2.5 and 1:8 metal ion to acrylate respectively, said acrylate ion being present in the polymerizable composition in amounts ranging from about 10% to 50% by weight and effecting under atmospheric conditions polymerization and water insolubilization of said polymerizable composition on the soil, by introduction into said solution of polymerizable material, from about 0.1% to about 25% by weight of a water soluble redox catalyst, wherein said percentages by weight are based on the total weight of the polymerizable material.

References Cited in the file of this patent

UNITED STATES PATENTS

| | | |
|---|---|---|
| 2,771,459 | Banes et al. | Nov. 20, 1956 |
| 2,801,985 | Roth | Aug. 6, 1957 |
| 2,837,500 | Andres et al. | June 3, 1958 |
| 2,838,466 | Padbury et al. | June 10, 1958 |

UNITED STATES PATENT OFFICE
CERTIFICATE OF CORRECTION

Patent No. 3,021,298            February 13, 1962

David H. Rakowitz

It is hereby certified that error appears in the above numbered patent requiring correction and that the said Letters Patent should read as corrected below.

Column 5, line 15, for "said" read -- sand --; column 6, line 17, for "006" read -- 0.06 --.

Signed and sealed this 24th day of July 1962.

(SEAL)
Attest:

ERNEST W. SWIDER
Attesting Officer

DAVID L. LADD
Commissioner of Patents